(12) United States Patent
Jones et al.

(10) Patent No.: US 7,034,951 B1
(45) Date of Patent: Apr. 25, 2006

(54) PRINTER COLLATOR FACILITY AND METHOD

(75) Inventors: Michael J. Jones, Corvallis, OR (US); Manlik Kwong, Corvallis, OR (US); Kathryn L. Mitchell, Corvallis, OR (US); James R. Miller, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/568,779

(22) Filed: May 10, 2000

(51) Int. Cl.
*G06K 1/00* (2006.01)
*G06F 15/00* (2006.01)

(52) U.S. Cl. .................. 358/1.12; 358/474; 382/209

(58) Field of Classification Search ........... 271/288, 271/278; 358/1.12, 1.13, 271, 296, 474; 209/587, 547; 399/15, 16, 72, 82, 403; 700/223; 382/209
See application file for complete search history.

(56) References Cited

U.S. PATENT DOCUMENTS

| | | | | |
|---|---|---|---|---|
| 4,414,579 A | * | 11/1983 | Dattilo et al. | 358/498 |
| 4,949,392 A | * | 8/1990 | Barski et al. | 382/283 |
| 5,452,058 A | | 9/1995 | Umeda | 399/15 |
| 5,559,933 A | * | 9/1996 | Boswell | 358/1.15 |
| 5,596,416 A | * | 1/1997 | Barry et al. | 358/296 |
| 5,752,697 A | | 5/1998 | Mandel et al. | 271/288 |
| 5,764,863 A | | 6/1998 | Fall et al. | 358/1.13 |
| 5,859,711 A | * | 1/1999 | Barry et al. | 358/296 |
| 5,970,218 A | | 10/1999 | Mullin et al. | 358/1.15 |
| 5,970,228 A | | 10/1999 | Nezu | 271/287 |
| 5,982,994 A | | 11/1999 | Mori et al. | 358/1.15 |

* cited by examiner

*Primary Examiner*—King Y. Poon

(57) ABSTRACT

A method of printing a plurality of documents includes generating a page file for each page of each document, generating a control file for each page file, and operating a number of printers to generate printed pages based on the page files. The method includes scanning the printed pages to generate a scan file for each page, and identifying the corresponding control file to permit the printed pages to be segregated into properly sequenced separate documents.

28 Claims, 3 Drawing Sheets

PRINTER COLLATOR FACILITY AND METHOD

FIELD OF THE INVENTION

This invention relates to computer printers, and particularly to collation of printer output.

BACKGROUND AND SUMMARY OF THE INVENTION

Computer printers each typically have a printing speed capacity designated in pages per minute (ppm). Some uses require very high speed printing, such as when many copies of a large document are needed in a short time. High speed or high volume printing is also needed in applications where substantial daily printing volume is required, even when no job is particularly urgent, such as in a large office with many users sharing a single printer.

High speed printers having printing rates above 100 ppm are available, but these are very expensive, even when considered in comparison to conventional printers on the basis of cost for a given daily capacity (i.e. the cost of ten printers each operating at one-tenth the speed of the high speed printer is much less than the cost of a single high speed printer.) In addition, high speed printers are typically limited to a single printing technology, typically black toner-based laser printing. Thus, for documents having some color, even a single color cover page, another printer must be used, or pages manually collated into documents from different printers after printing.

To provide high capacity, many offices with significant printing demands use a large number of low capacity printers, such as one for each employee. The printers may be networked so that one person may send a print job to any of the printers. This provides a high total capacity at a low cost, but lacks the capacity to conveniently print a large job quickly. A user needing many copies of a large document might ask each printer on the network to print a copy, but this is a cumbersome process requiring repeated print commands, and inconvenient collection of printed output scattered throughout a facility.

Cluster printing systems have been developed that use several printers controlled by a common controller that allocates printing jobs to the printers. On a job requiring multiple copies of a single large document, the controller may have each printer working on its own copy of the document, so that the output may be collected without sorting or collation. If a system were developed with different types of printers in the cluster, moderate speed laser printers may be used for printing monochrome documents such as conventional text, while a color printer may be used for documents containing any color printing. However, this system would not permit the use of more than one printer for different printing needs within a single document (such as for a color illustration page contained in an otherwise black text document), without introducing manual collation challenges.

When existing cluster systems are used by multiple users for different size print jobs, throughput may be optimized by scattering the load among the different printers, so that some documents may be printed on multiple printers, and some printers may be working on multiple documents. However, this creates a complex collation problem. Jobs and job portions may be identified by printing an initial identifying cover sheet that aids in the identification and reassembly of documents, and this cover sheet might be made machine-readable so that the process may be automated. However, the use of cover sheets consumes printer resources such as paper, ink, and throughput capacity.

The present invention overcomes the limitations of the prior art by providing a method of printing a plurality of documents including generating a page file for each page of each document, generating a control file for each page file, and operating a number of printers to generate printed pages based on the page files. The method includes scanning the printed pages to generate a scan file for each page, and identifying the corresponding control file to permit the printed pages to be segregated into properly sequenced separate documents.

DETAILED DESCRIPTION OF A PREFERRED EMBODIMENT

Figure 1:
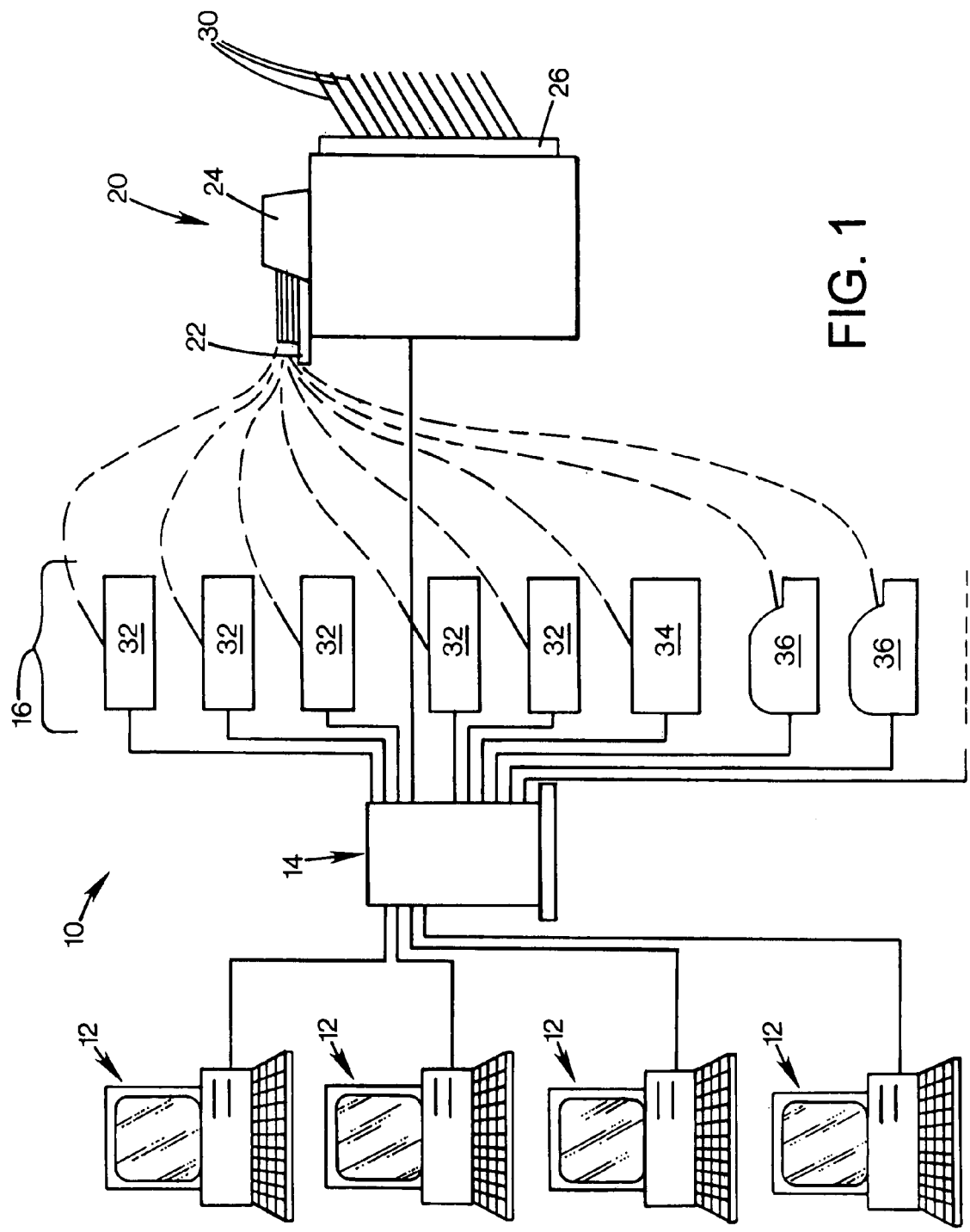
FIG. 1 is a schematic diagram of a printing system according to a preferred embodiment of the invention.

FIG. 1 shows a computing and printing system 10 including several computer workstations 12 or other equipment on which documents to be printed are created or modified. The computers are connected to a print server 14 by data cables or other means for sending print data files. The connection may be provided by wireless means, and the computers may be connected to the server by a network or via the internet. A printer set 16 includes several document printers, each connected to the server via a data cable or other means as noted above. A document sorter 20 is connected to the server via a data cable or other means, and includes a media input tray 22, a high resolution scanner 24, and a collator assembly 26 with multiple output bins 30.

The printer set 16 includes more than one type of printer. In the illustrated example, five moderately priced laser printers 32 provide conventional black document printing, each at a print rate of about 10–20 ppm. A large format printer 34 permits printing on larger than standard media sizes, and a pair of color ink jet printers 36 provide color printing.

The illustrated printers in the printer set are only one possible example. The number of printers may be unlimited, and may change over time as needs increase, allowing scalability in small capacity and cost increments. All printers may be identical, or there may be any number of different printer types. Printer types may differ based on print engine technology (black laser, color laser, ink jet, impact, LED, dye sublimation, etc.), color capability (monochrome, 3-color, 4-color, photographic ink sets), media size, media type (transparency, basic paper, preprinted letterhead, cover card stock, photographic paper, etc.), printing rate or speed, resolution, print quality, or any other way in which printers may differ to provide different capabilities to meet different needs.

The system is shown with separate interconnected server, printers, and sorter, each in a separate housing, However, all or some of the devices may be connected in a common housing, such as by incorporating the server, multiple print engines sharing one or more media bins, and the scanner and sorter, all in a common housing. This permits the entire process to be automated, so that one need not rely on an operator to gather printed output from the output trays of the printers and deliver it to the input of the sorter.

In one embodiment that would satisfy the needs of most users without requiring custom assembly of a printer set, a single printer type such as a conventional desktop ink jet printing engine may be used, with multiple identical engines in the printer system. By using different interchangeable ink cartridges or print heads, different capabilities can be provided by seemingly identical engines. A few engines can be supplied with color ink cartridges for printing pages requiring color, while the others may be provided with black ink supplies for printing conventional text pages. Such an embodiment may provide additional connections for other printers different from the included print engines, and to provide for the addition of one or more multi-engine printer sets to scale up capacity as needs increase substantially.

Other embodiments may employ modular print engines that connect to a rack associated with the server and sorter, permitting different print engine types to be selected by the user for a custom configuration. Also, even with conventional printers and a separate sorter, a conveyor system could be developed to gather output sheets and transfer them to the sorter. With an automated system, it may be possible for the system to know the identity of each page based on the sequence received from each printer, and sort accordingly, but this assumes that none of the printers run out of supplies, suffer jams, pick multiple media sheets (generating an extra blank sheet), or suffer other types of errors or failures to which printers are occasionally prone. The preferred embodiment employs a system and technique that tolerates these errors, as it tolerates the randomization of the printer output before sorting, such as if an attendant dropped a stack of printer output on the floor while transferring the sheets to the sorter.

The system operates to compare a scan file generated by the scanner of each page, with the group of printer files (each visually analogous to a page to be printed) associated with the range that may include the scanned page. The matching printer file is identified, and it's document identity and page number are identified, so that the corresponding scanned sheet may be collected in the proper sequence in an output bin 30 of the sorter with other pages of the same document, even if printed by other printers or in a different sequence.

Figure 2:
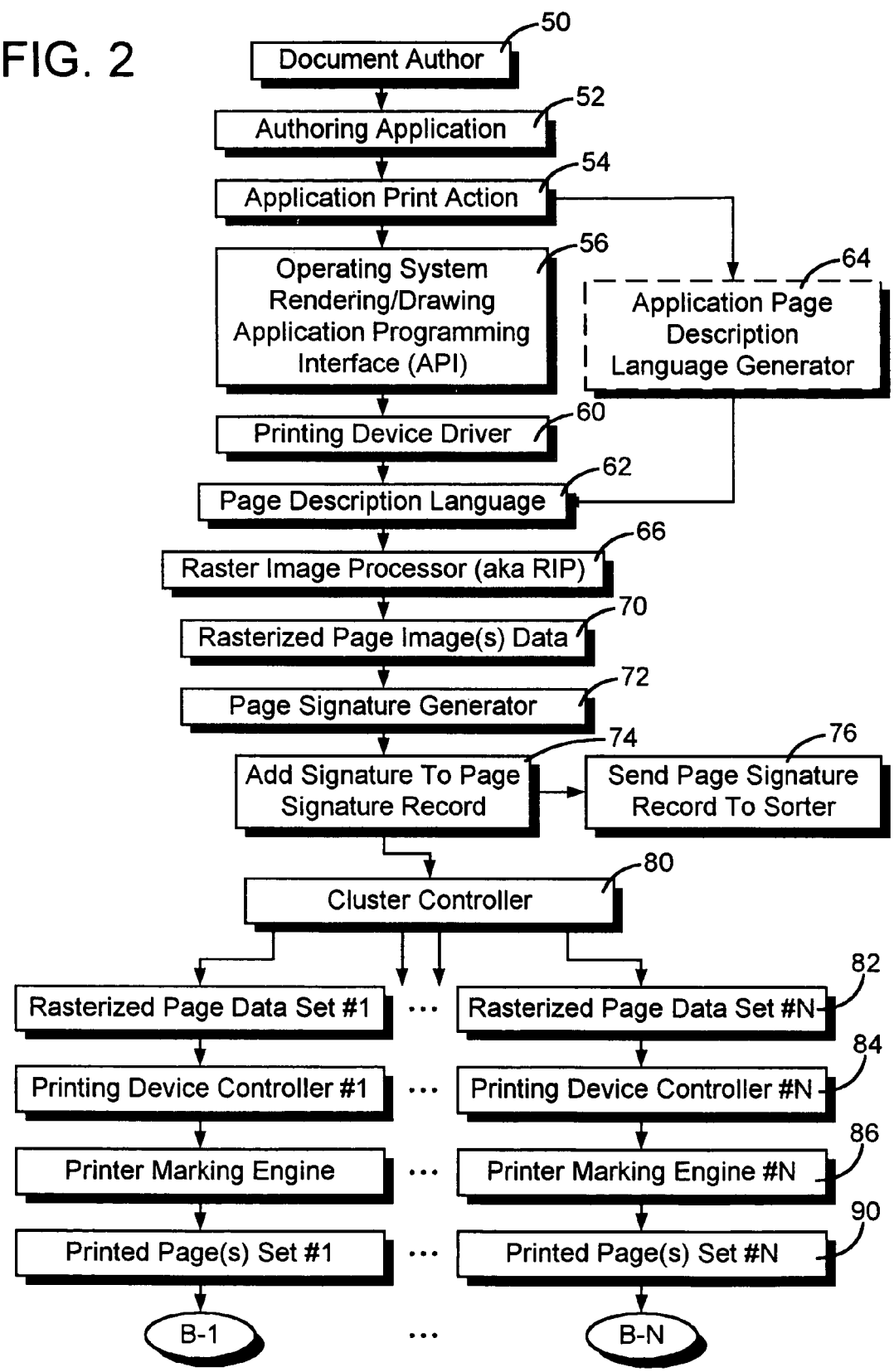
FIGS. 2 and 3 are flow charts illustrating a method of operation of the embodiment of FIG. 1.

As shown in FIG. 2, a document Author 50 uses an Authoring Application 52 (e.g. Microsoft Word, Adobe FrameMaker) to create a document. The Author requests an Application Print Action 54 to initiate printing of the document. Normally, the authoring Application uses the computer operating system Rendering/Drawing Application Programming Interface 56 (API) (e.g. Microsoft Windows Graphics Drawing Interface (GDI)) to send Rendering/Drawing Commands to a Printing Device Driver 60 (e.g. Hewlett-Packard DeskJet 970cxi Microsoft Windows 98 device driver software as supplied with DeskJet 970cxi printer.)

The Printing Device Driver outputs document content in a Page Description Language 62 (PDL) (e.g. Hewlett-Packard Printer Control Language (PCL) Version 5, Adobe PostScript Level 3) suited to the specific printing device. Alternatively, some applications may generate Page Description Language directly 64, such as is most common when the PostScript PDL is generated by a sophisticated design application, e.g. QuarkXPpress or Adobe FrameMaker.

A Raster Image Processor 66, such as contained in Hewlett-Packard DeskJet 970cxi MS Windows 98 device driver, usually a functional component of the Printing Device Driver software, converts Page Description Language into Rasterized Page Image Data 70 for each document page. This data is essentially a control file containing the image in a format that is analogous to the desired printed output. It includes a matrix of pixels, and indicates the value or color of each pixel in the image. Text and images are indicated by matrices of pixels, not by letter codes (e.g. ASCII) or vectors and line widths.

A Page Signature Generator 72 computes a unique control file or Page Signature for each page's Rasterized Page Image Data. The Page Signatures for each document page are aggregated into a Page Signature Record 74 for the document. Thus, after all pages of a document have been processed by the Page Signature Generator, the Page Signature Record will include a unique signature for every page in the document to be printed. Note that the signatures in the Record will be ordered the same as were the pages in the original document, so that knowledge of a page's signature provides knowledge of the order in which the corresponding page is found in the document.

Many different algorithms can be used by the Page Signature Generator to produce a unique signature for each document page. For example, in the simplest case where efficiency, speed, and computing power is not a concern, the page signature may be the same as the complete Rasterized Page Image Data for that page. In other cases, the page signature may be computed by generating a result of a function of limited portions of the Rasterized Page Image Data, such as by using a limited sample of pixels scattered within the raster, a limited portion of data from all or some pixels, a limited segment or thumbnail of the page. Innumerable alternative quantification methods used for pattern recognition of faces, fingerprints, alphanumeric characters, handwriting, and other images may be used.

In one simple example for the case of exclusively text printing, an optical character reader software may be applied to the Rasterized Page Image Data to generate a text string serving as the Page Signature. This text string might even be derived from the Authoring Application. However, to provide for printing of non-text graphics and photo images, other techniques are preferred.

In another example, the Page Signature may be generated by adding the most significant bits of each pixel sub-value (e.g. R for red component, G for green component, and B for blue component) in the Rasterized Page Image Data for each page to create a "checksum," cyclic redundancy code (CRC) or other identifier. The sub-value summations (e.g. for R, G, B) for a given Rasterized Page Image Data would collectively form the unique signature for that page and be placed in the Page Signature Record. In any embodiment, the Page Signature must function as a unique identifier of the page, so that even a very similar page can be distinguished. This need not require the use of all data points in the Rasterized Page Image, but an adequate sample must be taken to minimize the possibility in a given period of printing that two pages will have the same signature. The Page Signature Record is then sent in step 76 to a controller in the sorter 20, or to circuitry in the server 14 that later provides this information to the sorter as needed.

The printing process proceeds with transmission of the Rasterized Page Image Data to a Cluster Controller 80 connected to each of the printers. The Cluster Controller is a function of an enhanced Printing Device Driver in the preferred embodiment of the invention, but may also be a separate process. The Cluster Controller assigns incoming Rasterized Page Image Data to a Rasterized Page Data Set 82 for a specific available Printing Device B-N. The Cluster Controller may employ different algorithms for the page assignment, e.g. black and white pages may be assigned to a Page Set for a monochrome printing device and color pages may be assigned to a Page Set for an inkjet color printing device or pages may be equally divided across available printing devices, etc. In any event, the result of processing the Rasterized Page Image Data by the Cluster Controller is one or more Rasterized Page Data Sets, with a Page Data Set for each printing device to be used to print the document.

The Rasterized Page Data Sets are sent to a Printing Device Controller 84 in each printer, which commands a Printer Marking Engine 86 in the printer (e.g. an inkjet printing engine, laser engine, etc.) to print the document pages and produce a complete Printed Page Set 90 for that printing device. Each Printed Page set is designated B-1, B-2 . . . B-N as indicated, and includes an appropriate number of pages numbering zero or more from each printer.

Figure 3:
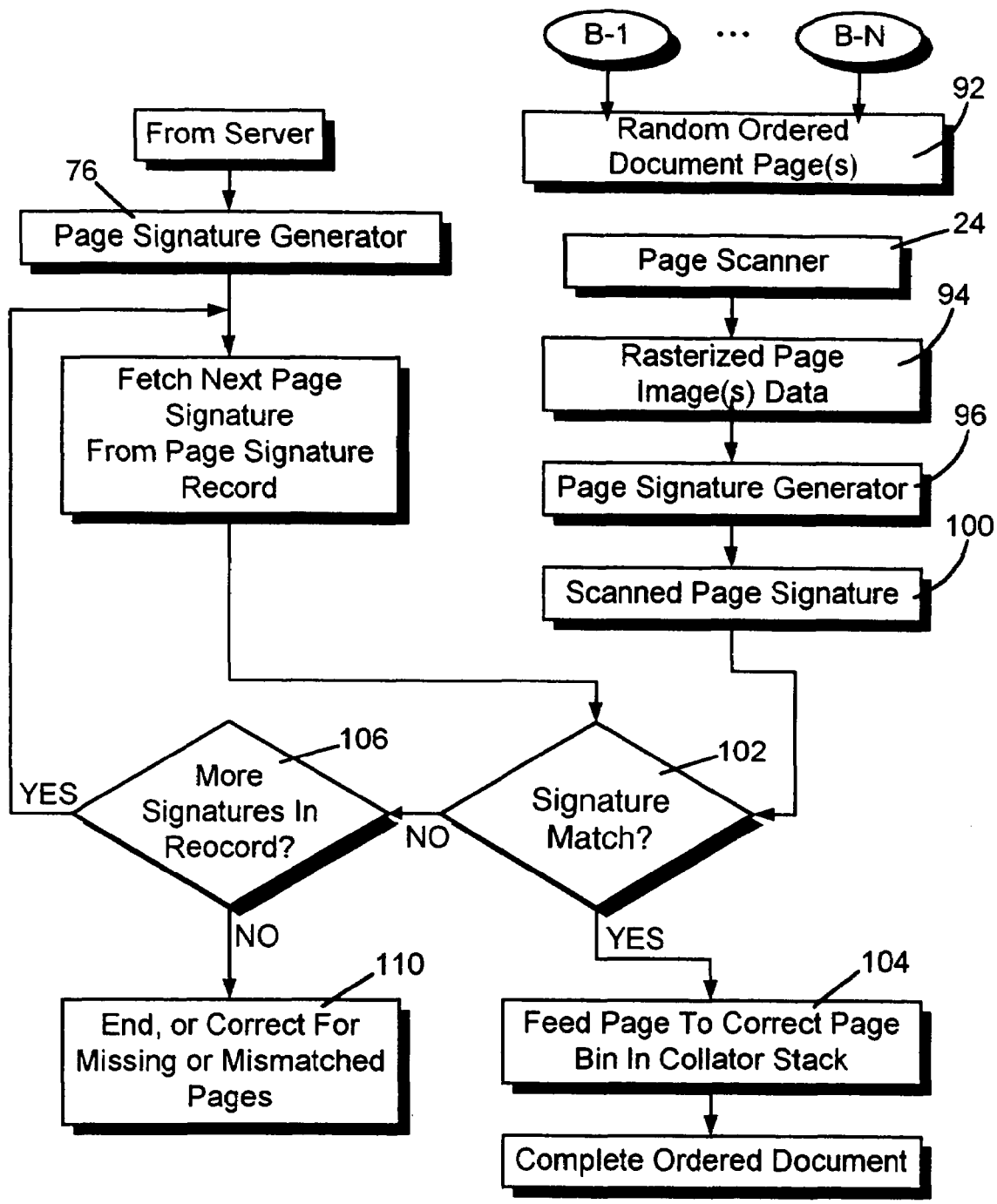

FIG. 3 shows the method of re-assembling the Printed Page Sets produced by the Cluster Printer into the original document order. The page sets enter the process in any order, producing an aggregate collection of all document pages 92 in unknown, theoretically (or practically) random order. Each page is scanned by the scanner 24, producing a Rasterized Page Image Data 94 set for each page of the document. A Page Signature Generator 96 employing the same algorithm of the Page Signature Generator noted above processes each Rasterized Page Image Data set to produce a unique scan file or Scanned Page Signature 100 for each printed document page.

Each Scanned Page Signature is compared 102 with every Page Signature in the document Page Signature Record 76 until a match is found. When a match is found, the page position/number corresponds to the entry number of the matching signature in the Page Signature Record. Once the page position/number is determined for a specific document page, the collator is commanded at step 104 to put the page in the correct collator bin 30. When all pages have been processed as determined at block 106, the complete document will be available, correctly ordered, in the collator bin. The processing of the document is completed at step 110, unless there is a need to make a correction or reprint as will be discussed below. Preferably, the collator includes an ordering facility for each bin that permits pages deposited in a bin in incorrect but known order (i.e. the order in which the pages were loaded into the sorter), and reorder them into the correct order.

The source file/scan file comparison process may include features and algorithms to enhance processing speed, and to improve accuracy. For instance, if one page in a document has been identified, the next Scanned Page Signature may be compared to the next Page Signature in sequence, on the assumption that multiple pages may be printed in sequence, and that the sequence has been preserved on transfer to the sorter. This aids in preserving accuracy when a document has two very similar pages (e.g. comparing slightly different photos, without a page number). In this case, both may appear to be matches, but the knowledge that pages before and after the ambiguous pair were in sequence help to resolve the uncertainty.

Because a scanner will not generate exactly the same digital record every time due to dust, media alignment, and other factors, there may not be a perfect match in all cases. In such cases, ambiguous near matches may be reserved, so that other confident matches may eliminate some of the incorrect alternatives. If any ambiguity remains, the unmatched scan signatures and unmatched print signatures may be paired-off in a way that maximizes a total match quality score. If this is inadequate, the server may be operated to store the original Rasterized Page Images (RPI), storing them until a good match is made. If any matches remain unmade, the RPI files of the unmatched pages may used to create more robust signatures, and the scan files may similarly be stored to create more robust scan signatures. Alternatively, unmatched scanned pages may be assumed to be misprinted, damaged, or otherwise unusable. Such pages may be discarded, and the server operated to reprint the pages for which scan matches were not found, with the scanning and comparing process proceeding normally for the make-up pages.

When no match is found for a Scanned Page Signature in the Page Signature Record, an error message may be presented to an operator of the system indicating the occurrence of a problem and providing information about the rejected page, possibly including a graphic representation of the page data to aid in its identification. The operator would use manual intervention to recover from the error. In a preferred implementation, the reject page information, including the page signature(s) in the Page Signature Record for which no Scanned Page Signature's were matched, is sent back to the Cluster Printer which is then commanded to reprint the reject or missing page(s). This would provide a degree of fault-tolerance to the overall cluster printing system. With the ability of the scanner system not only to identify correctly printed pages, but to identify unmatched and therefore presumably misprinted or damaged pages, the system not only provides sequencing and collation capability, but serves as an output quality control checker, with the means to rapidly identify problems (such as a depleted ink supply) and the means to correct the problem (by notifying the user, and by reprinting the affected pages on an operable printer unit.)

While the above is discussed in terms of preferred and alternative embodiments, the invention is not intended to be so limited.

The invention claimed is:

1. A method of processing documents comprising: providing a plurality of printers connected to a controller; transmitting a first document file to the controller; generating a first control file based on the first document file; printing a plurality of pages of the first document file; scanning the pages printed from the first document file to generate a first scan file; comparing the first control file and the first scan file to correlate the pages printed from the first document file with the first document file; transmitting a second document file to the controller, and wherein printing includes printing a plurality of pages of the first document file and a plurality of pages of the second document file with the printers; and generating a second control file based on the second document file; scanning the pages printed from the second document file along with the scanning of the pages printed from the first document file in any order; comparing the second control file and the second scan file to correlate the pages printed from the second document file with the second document file; re-assembling the pages printed from the first document file and the pages printed from the second document file based upon the correlation between the pages printed from the first document file with the first document file and the correlation between the pages printed from the second document file with the second document file.

2. The method of claim 1 wherein the first document file comprises a multi-page document, and wherein printing includes printing at least one of the pages on a first printer and at least another page on a second printer.

3. The method of claim 1 wherein providing a plurality of printers includes providing at least two different types of printers.

4. The method of claim 1 wherein generating the first control file includes generating a first control file portion for each of the pages printed from the first document file, and wherein generating the first scan file includes generating a first scan file portion for each of the pages printed from the first document file.

5. The method of claim 4 wherein the comparing includes, for each first scan file portion, seeking the closest match among the first control file portions.

6. The method of claim 4 wherein generating a control file portion includes generating a compressed representation of at least a portion of the corresponding page.

7. The method of claim 1 including collecting multiple printed documents from the printers and feeding them into a scanner in a single batch.

8. A method of processing documents comprising:
providing a plurality of printers connected to a controller;
transmitting a document file to the controller;
generating a control file based on the document file;
printing a document based on the document file;
scanning the document to generate a scan file;
comparing the control file and the scan file to correlate the printed document with the document file; and
wherein the scanning and comparing include sequentially scanning each printed page, identifying a page position of each printed page within the document file based upon the comparison between the control file and the scan file, and moving the printed page to a selected location for reassembly with other pages from the document, the selected location being associated with the page position of the printed page.

9. The method of claim 8, wherein the document file is for a multi-page document, and wherein printing includes printing at least one of the pages on a first printer and at least another page on a second printer.

10. The method of claim 8, wherein providing a plurality of printers includes providing at least two different types of printers.

11. The method of claim 8, wherein generating the control file includes generating a control file portion for each page to be printed, and wherein generating the scan file includes generating a scan file portion for each printed page.

12. The method of claim 11 wherein the comparing includes for each scan file portion seeking the closest match among the control file portions.

13. The method of claim 11 wherein generating a control file portion includes generating a compressed representation of at least a portion of the corresponding page.

14. The method of claim 8, including collecting multiple printed documents from the printers and feeding them into a scanner in a single batch.

15. A method of printing a plurality of documents comprising:
generating a page file for each page of each document;
generating a control file for each page file;
operating a plurality of printers to generate printed pages;
scanning the printed pages to generate a scan file; and
for each scan file, identifying the corresponding control file to permit the printed pages to be segregated into properly sequenced separate documents.

16. The method of claim 15 wherein generating the scan file includes employing pattern recognition.

17. The method of claim 15 including transferring the printed pages to a scanner, including collecting the pages from the printers in any order.

18. The method of claim 15 wherein scanning includes scanning the pages from all the printers in a common scanner facility.

19. The method of claim 15 including limiting printing only to the pages of the printed documents, such that cover sheets identifying print jobs are not required.

20. The method of claim 15 wherein at least one of the documents has pages printed by different printers.

21. The method of claim 15 wherein at least one of the printers prints different documents.

22. The method of claim 15 including selecting which printer prints which pages based on a criterion other than maintaining sequential printing of pages in a document.

23. The method of claim 15 including transmitting the control files to a common controller connected to the printers and the scanners.

24. A document processing facility comprising;
a plurality of printers;
a common controller connected to the printers;
a scanner connected to the controller and operable to scan documents printed by the printers;
a sorter connected to the scanner; and
control means for generating control files based on a print data file, for generating a scan file based on scanning a printed page, and for comparing the scan file with the control file to identify the portion of the print data file to which the printed page corresponds.

25. The facility of claim 24 wherein the controller is operable to compare a scan file generated by the scanner with printer control files based on print data.

26. The facility of claim 24 wherein the controller includes data compression means for generating a control file based upon, and smaller than, a print data file.

27. The facility of claim 24 including at least two different printer types.

28. The facility of claim 27 wherein the printers differ based on a type selected from a group of types including color capability, speed, pigment chemistry, media capability, media size, and print engine configuration.

* * * * *